United States Patent Office 3,445,542
Patented May 20, 1969

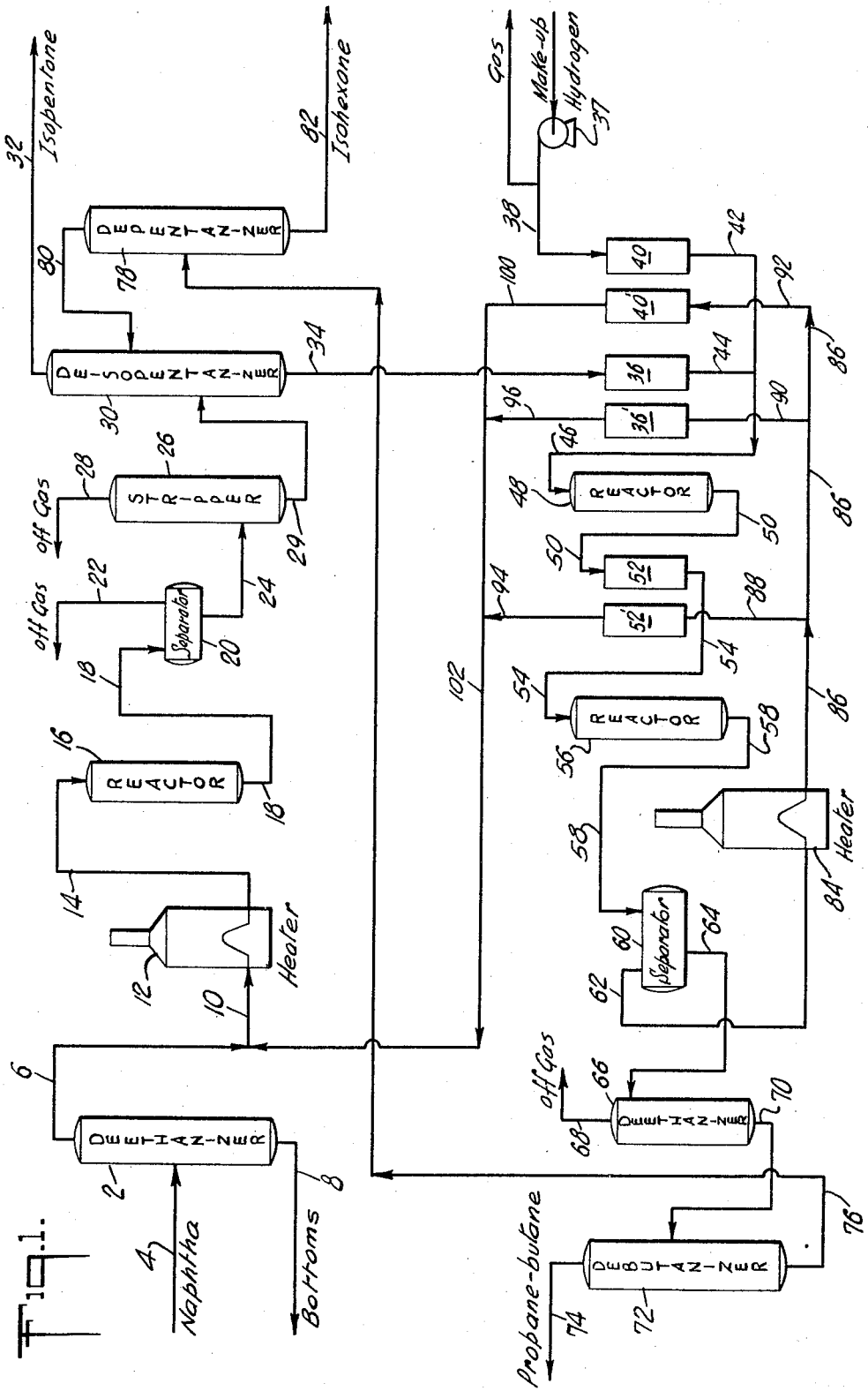

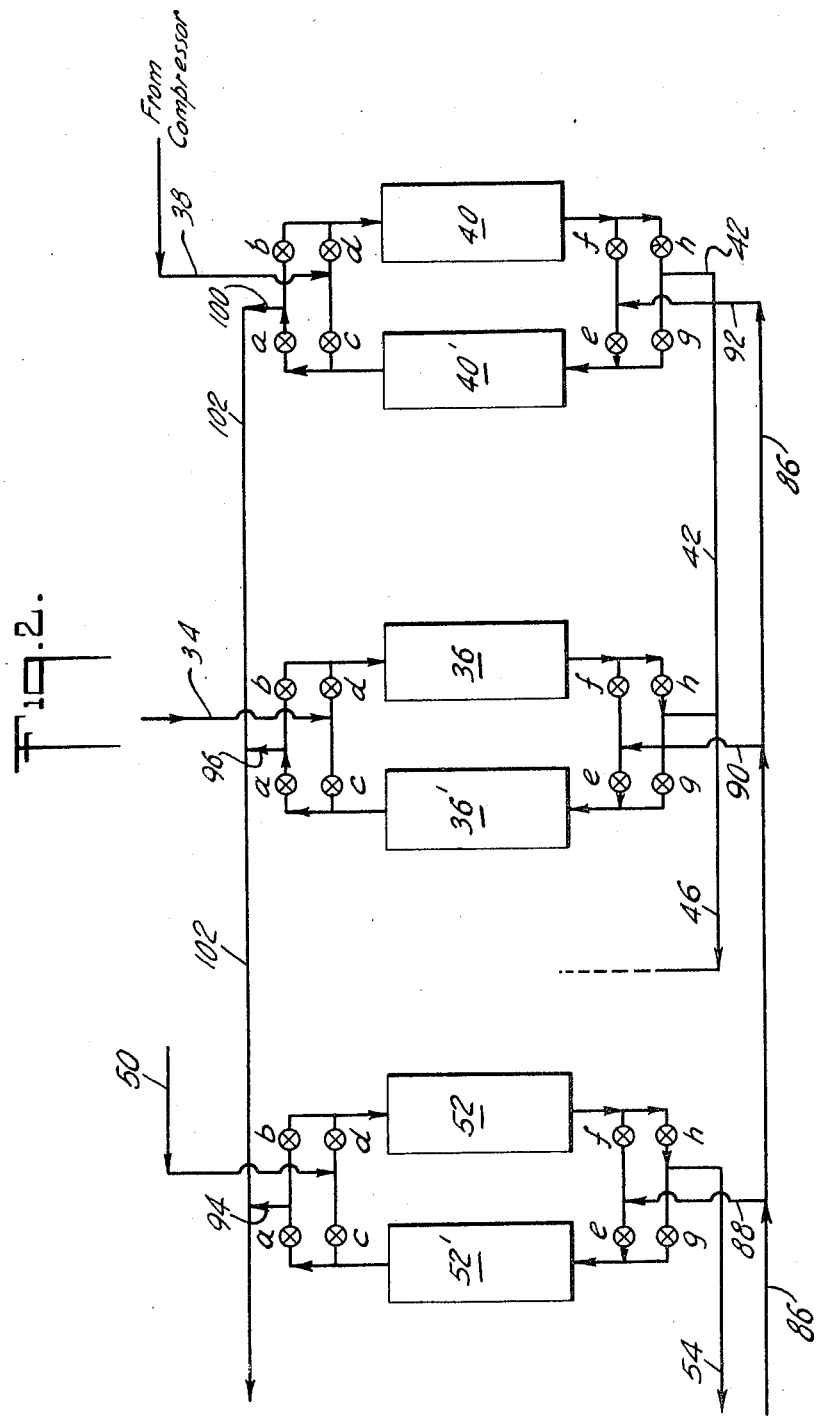

3,445,542
SEPARATION OF IMPURITIES IN AN ISOMERIZATION PROCESS
Dorrance P. Bunn, Jr., and Edward F. Janes, Houston, Tex., assignors to Texaco Inc., New York, N.Y., a corporation of Delaware
Filed Nov. 17, 1966, Ser. No. 595,142
Int. Cl. C07c *5/30, 7/12;* C10g *39/00*
U.S. Cl. 260—683.65                               12 Claims

ABSTRACT OF THE DISCLOSURE

A process for isomerizing a $C_4$ to $C_7$ isomerizable hydrocarbon containing an impurity by passing the hydrocarbon through a molecular sieve bed to selectively separate the impurity, thereafter isomerizing the hydrocarbon and separating the isomerization product into a liqiud and gaseous effluent, passing the gaseous effluent through the spent molecular sieve bed to desorb the impurity contained in the bed and recovering the isomerized hydrocarbon from the liquid effluent.

---

This invention relates to a process for hydrocarbon conversion e.g. isomerization of isomerizable hydrocarbon, particularly a normal hydrocarbon in the $C_4$–$C_6$ range, wherein the charge to the hydrocarbon conversion vessel first passes through a molecular sieve bed. More particularly, this invention relates to a process for isomerizing an isomerizable hydrocarbon, especially one in the $C_4$–$C_6$ range, wherein the charge to the isomerization vessel first passes through a molecular sieve bed to selectively separate impurities therein and a spent molecular sieve bed is regenerated using a gaseous stream from the isomerization section effluent treating section.

In hydrocarbon conversion processes, it is generally old to employ molecular sieves to purify the charge to the hydrocarbon conversion reactor. Specifically it has been found that certain impurities, notably $H_2S$, $H_2O$, ammonia and compounds of sulfur, tend to deactivate certain hydrocarbon conversion catalysts. This problem is particularly acute in the case of catalysts used for the isomerization of isomerizable hydrocarbons. In a continuous isomerization process of say a normal hydrocarbon in the $C_4$–$C_6$ range, introduction of a hydrocarbon feed into an isomerization vessel containing an isomerization catalyst can cause relatively rapid degradation of the isomerization catalyst necessitating regeneration thereof unless the charge has had separated therefrom these above-mentioned impurities. Specifically, it has been found desirable to separate from the hydrocarbon charge the aforementioned impurities which tend to deactivate the catalyst and thereby reduce its life span. As mentioned above, molecular sieves have been used for this purpose.

However, the molecular sieve bed after a period of time absorbs a maximum amount of impurities therein, depending upon the specific molecular sieve employed. The molecular sieve bed then has a substantially marked decrease in its efficiency as determined by analysis of the effluent from the molecular sieve bed. Thus, in the usual fixed bed adsorption process the flow of feedstock into the bed of adsorbent is interrupted when the adsorptive capacity of the adsorbent is saturated, the removal of the adsorbate from the feedstock gradually declining as the adsorbent approaches saturation. This spent molecular sieve bed must then be regenerated. Heretofore the molecular sieve bed has been regenerated using a separate gaseous stream admitted therethrough to withdraw the impurities therein according to the law of mass action. Generally, this regeneration step has necessitated substantial amount of additional equipment just to regenerate the molecular sieve so that it can be returned to the process. It is therefore very desirable to provide a process for isomerizing an isomerizable hydrocarbon wherein the charge to the isomerization vessel first passes through a molecular sieve bed to selectively separate impurities in the feed stream and wherein the spent molecular sieve can be regenerated using a gaseous component of the isomerization process itself rather than employing a separate system designed merely for molecular sieve regeneration.

It is an object of this invention to provide a process for hydrocarbon conversion employing molecular sieve as a means for selectively separating impurities in the hydrocarbon feed wherein a gaseous component of the hydrocarbon conversion process can be utilized to regenerate spent molecular sieve without employing any separate system maintained merely for molecular sieve regeneration.

It is still another object of this invention to provide such a process for isomerization of isomerizable hydrocarbons, particularly those in the $C_4$–$C_6$ range, which can be performed on a continuous basis providing continuous selective separation of impurities from the isomerization feed stream and continuous regeneration of any spent molecular sieve utilized in the process.

These and other objects of our invention will become apparent from the following complete description, accompanying drawings and appended claims:

Broadly, this invention contemplates a process for hydrocarbon conversion which comprises:

(a) Passing the hydrocarbon through a molecular sieve bed to selectively separate impurities therein;

(b) Passing the effluent from said molecular sieve bed into a hydrocarbon conversion vessel containing a hydrocarbon conversion catalyst and maintained under conditions of temperature and pressure suitable for hydrocarbon conversion;

(c) Withdrawing the so-converted hydrocarbon from said vessel together with a gaseous effluent;

(d) Separating the gaseous effluent from the liquid effluent;

(e) Passing said gaseous effluent through a spent molecular sieve bed under conditions of temperature and pressure suitable for desorbing the impurities on the molecular sieve; and (f) Recovering converted hydrocarbon from the liquid effluent from the hydrocarbon conversion vessel.

In a particularly desirable embodiment, this invention contemplates a process for isomerizing an isomerizable hydrocarbon which comprises:

(a) Passing the hydrocarbon through a molecular sieve bed to selectively separate impurities therein;

(b) Passing the effluent from said molecular sieve bed into an isomerization vessel containing an isomerization catalyst and maintained under conditions of temperature and pressure suitable for isomerization;

(c) Withdrawing the so-isomerized hydrocarbon from said vessel together with a gaseous effluent;

(d) Separating the gaseous effluent from the liquid effluent;

(e) Passing said gaseous effluent through a spent molecular sieve bed under conditions of temperature and pressure suitable for desorbing impurities on the molecular sieve; and (f) Recovering isomerized hydrocarbon from the liquid effluent from the isomerization vessel.

In a still more particularly desirable embodiment, the process of this invention is performed on a continuous basis by continuously passing the hydrocarbon to the molecular sieve bed; continuously withdrawing from said molecular sieve bed an effluent and continuously passing the same into the isomerization vessel; continuously withdrawing the so isomerized hydrocarbon from the vessel together with the gaseous effluent; continuously separating the gaseous effluent from the liquid effluent and continuously passing the said gaseous effluent to the molecular sieve bed under conditions of temperature and pressure as more fully described below suitable for desorbing the impurities retained in the molecular sieve.

The isomerization process of our invention can be performed using a charge of hydrogen and isomerizable hydrocarbon into the isomerization vessel such that the mol ratio of hydrogen to hydrocarbon is between about 0.05:1 and 5:1 preferably within the range of about 0.5:1 to 2:1 for pentanes and hexanes and 0.1:1 to 1:1 for butanes. The hydrogen and hydrocarbon to be isomerized pass into the isomerization vessel under suitable conditions of temperature and pressure for the isomerization of the particular hydrocarbon or hydrocarbons being ismerized. For hydrocarbon streams consisting chiefly of pentanes and hexanes, a temperature of 200–350° F. is suitable but a temperature between 280 and 330° F. is preferred. For lower molecular weight hydrocarbons, e.g. butanes specifically, it is desired that the temperature be between 300 and 400° F. and most preferably within the range of 315–350° F. The pressure on the feed of the isomerization vessel can be maintained within a wide range generally between 300 and 500 p.s.i.g. The isomerizable hydrocarbon passes over an isomerization catalyst consisting of say a platinum alumina composite activated and stabilized in accordance with the process of U.S.P. 3,242,228 of Mar. 22, 1966 to Riordan and Estes entitled, "Hydrocarbon Isomerization Process and Catalyst," The liquid hourly space velocity (LHSV) of the hydrocarbons passing through the isomerization vessel is generally between about 0.5 and 10.0, preferably within the range of about 0.75 and 4.0 volumes hydrocarbon per hour per volume of catalyst.

Catalyst useful in the isomerization process of our invention include those prepared by compositing platinum with alumina and forming a composite comprising a major portion of alumina and about 0.01 to about 1.0 percent by weight platinum and contacting the composite with an activating agent consisting essentially of an organic choride such as carbon tetrachloride, chloroform, methylene chloride, phosgene and trichloroacetyl chloride, and heating the composite in contact with the activating agent to a temperature within the range of say 300–650° F. There is thus prepared a platinum-alumina composite which is activated with an organic chloride wherein the catalyst contains 0.01 to about 1 percent by weight platinum, about 1 to about 10 percent by weight chlorine. Other catalyst which can be used in the isomerization of this invention include those catalysts prepared by contacting a composite of alumina and platinum with an organic chloride containing at least 2 carbon atoms and a mol ratio of hydrogen to chlorine less than 1.0 in an atmosphere containing gaseous oxygen at a temperature within the range of say 300–800° F. These catalyst normally have about 0.01 to about 2.0 weight percent platinum and about 3.0 to 12 percent by weight chlorine. The organic chloride can be any one of the following compounds: sym-tetrachloroethane, tetrachloroethylene, hexachloroethane, pentachloroethane, hexachlorobutadiene, hexachloropropanone-2, trichloracetyl chloride. The before mentioned catalyst are merely exemplary of those catalyst which can be used in accordance with the process of the instant invention. It should be understood that other catalyst not specifically mentioned above can be employed as the main crux of our invention does not revolve around the specific isomerization catalyst employed.

The molecular sieve used is generally one which has sufficient size to adsorb the impurities to be adsorbed, normally $H_2S$, $H_2O$, $NH_3$, etc., but not of sufficient size to adsorb the hydrocarbon feed. For this purpose it has generally been found that a 4 A. molecular sieve is suitable although other sieves having the same general size as a 4 A. sieve can be employed. Together with the 4 A. molecular sieve, one can employ a 13× molecular sieve to selectively adsorb therein some unsaturated aliphatic hydrocarbon which tends to have an adverse effect upon the isomerization catalyst.

In order to more fully understand the nature of the invention and the manner of practicing the same, particularly on a commercial scale, reference is had to the accompanying flow diagrams FIGURES 1 and 2. A charge of $C_5$=335° F. fraction naphtha is introduced into a dehexanizer 2 via line 4. An overhead chiefly of pentanes and hexanes is taken overhead from the dehexanizer into line 6 and a bottom component boiling in the range of 170–355° F. is withdrawn from the bottom of dehexanizer 2 into line 8. The mixture in line 6 is fed into line 10 and then into a heater 12 where the mixture in conjunction with the gases entering line 10 via line 102 is heated. The effluent from the heater passes therefrom into line 14 and enters a hydrotreating unit maintained under suitable conditions of temperature and pressure sufficient to substantially convert any sulfur compounds to $H_2S$, any oxygen to water, and any nitrogen compounds to ammonia, plus hydrogenate substantial amounts of aliphatic unsaturates, all of which may be present in the feed stream. This hydrotreating unit 16 can contain a hydrogenation catalyst such as American Cyanamid HDS–3. The effluent from hydrotreating unit 16 passes outline 18 and enters a separator 20 from which the gaseous phase is bled out line 22. The liquid phase containing the aliphatic hydrocarbons to be isomerized is withdrawn from the liquid gas separator 20 in line 24 and enters a feed stripper 26 where any dissolved gaseous material in the feed stream is withdrawn in line 28. The liquid effluent from the stripper passes therefrom via line 29 to a deisopentanizer 30 from which is withdrawn as overhead, isopentane in line 32. Unisomerized hydrocarbons to be isomerized are withdrawn therefrom as bottoms in line 34 and enter molecular sieve bed 36 containing a 4 A. molecular sieve. At the same time and continuously therewith there is introduced into line 38 from compressor 37 makeup hydrogen gas which passes through a separate molecular sieve bed 40 containing a suitable molecular sieve e.g. a 4 A. molecular sieve to selectively separate any impurities from hydrogen. The make-up hydrogen can suitably come from a catalytic reforming unit or any other suitable source containing a sufficient percentage of hydrogen in the gaseous effluent component. The hydrogen effluent from molecular sieve bed 40 enters line 42 and the liquid effluent from molecular sieve bed 36 which has had impurities selectively adsorbed by the molecular sieve therein is withdrawn in line 44 and mixes with the hydrogen in line 42. The mixture of hydrogen and hydrocarbon suitably in a ratio of between about 0.05:1 and 5:1, preferably within the range of about 0.5:1 to 2:1 for mixture of pentanes and hexanes, continues through line 46 and is admitted into a hydrogenation reactor containing a hydrogenation catalyst to hydrogenate any aromatic compounds to a form so that they may not have a deleterious effect upon the isomerization catalyst employed downstream. A suitable hydrogenation catalyst for this purpose is nickel on alumina such as a catalyst sold by Harshaw Chemical Company under the designation Ni–1404–T.

The vapor effluent from the hydrogenation reactor 48 is withdrawn in line 50 and passes through a molecular sieve bed used as a catalyst guard sieve bed. This is designated in the acocmpanying drawing as guard sieve 52. Molecular sieve of the 13× type is suitable for use in the guard sieve 52. The vapor effluent which is relatively pure is withdrawn from guard sieve 52 into line 54 and enters an isomerization vessel 56. The isomerization vessel can contain any of the above-mentioned isomerization or hydrocarbon conversion catalysts or others useful for isomerizing isomerizable hydrocarbons. The isomerization vessel is maintained under conditions of temperature and pressure suitable for isomerization. For hydrocarbon streams consisting chiefly of pentanes and hexanes a temperature within the range of 250–350° F. is suitable and a temperature within the range of 280–330° F. is preferred. For butane isomerization temperatures within the range of 300–400° F. are suitable while temperatures within the range of 315–350° F. are preferred. The isomerization, normally effected under pressure is carried out in the vapor phase. Generally, pressures within the range of 300–750 p.s.i.g. have been found convenient. A liquid hourly spaced velocity (LHSV), that is, the volume of liquid charged per hour per volume of catalyst, within the range of 0.5 to 10.0 and preferably within the range of about 0.75 to 4.0 is employed. The isomerization effluent containing isomerized hydrocarbon is withdrawn from the isomerization vessel 56 in line 58 and passes to a high pressure separator 60 where a gaseous component is taken overhead in line 62 and utilized in accordance with the discovery of this invention as more fully discussed below. The liquid is withdrawn from separator 60 in line 64 and enters a deethanizer 66 from which any dissolved gases particularly ethane are withdrawn overhead in line 68. Liquid products are withdrawn as bottoms from deethanizer 66 in line 70 and enters a debutanizer 72 from which a propane/butane fraction is taken overhead in line 74. The debutanized liquid is withdrawn from the debutanizer 72 in line 76 and enters a depentanizer 78 from which is withdrawn any pentanes present in line 80. This pentane overhead is then fed into the diisopentanizer 30 where the isopentane is withdrawn overhead in line 32, the normal pentanes being withdrawn as bottoms therefrom in line 34 and being introduced into the isomerization process. An isohexane bottom is withdrawn from the depentanizer 78 in line 82 and is treated and/or recovered according to well known procedures.

The gaseous component that is withdrawn from the separator 60 in line 62 passes through a sieve heater 84 where it is heated to a temperature sufficient to desorb any impurities present on the spent molecular sieve beds. The heated gaseous component, suitably at a temperature in the range of 400° F. to 700° F., leaves heater 84 in line 86. It is then divided into three streams which pass into lines 88, 90 and 92. These streams feed a molecular sieve bed of spent molecular sieve and serve to desorb these molecular sieves of any adsorbed impurities thereon. The adsorbate leaves the bed in lines 94, 96 and 100 and the contents of these lines are joined together in line 102 which subsequently feeds into line 10 together with the isomerization charge continuously being fed therethrough. The impurities passed through these lines are withdrawn principally as off gas in line 22 of the separator 20 or the off gas from the stripper 26 in line 28.

The gaseous effluent from sieve heater 84 feeds the spent molecular sieve beds designated 40′, 36′ and 52′ at a temperature in the range of between 400 and 700° F. and at a pressure suitably in the range of between 5 and 400 p.s.i.g. The gaseous effluent from sieve heater 84 passes through these beds of spent molecular sieve 40′, 44′ and 52′ at a volumetric hourly space velocity of suitably between 45 and 250 volumetric hourly space velocity is the volume of gas measured at 60° F. and 1 atmospheric pressure per hour per volume of catalyst.

In actual practice the selective separation of impurities from the hydrogen feed to the isomerization process and from the feedstreams of hydrocarbon is performed conjunctively with the desorption of spent molecular sieve beds using several pair of molecular sieve beds, one bed of the pair continuously adsorbing while the other is continuously desorbing as above described. In commercial operations this can be done by an arrangement of vessels shown in FIGURE 2. The feed stream of hydrocarbon to be isomerized containing the aforesaid impurities enters molecular sieve bed 36 via line 34 while the hydrogen from the compressor enters molecular sieve bed 40 via line 38 and the effluent from the hydrogenation reactor 48 enters molecular sieve bed 52 via line 50. At the same time, these beds are being charged, molecular sieve beds 40′, 36′ and 52′ are being desorbed. They are being desorbed using the gaseous effluent from sieve heater 84 via lines 86, 88, 90 and 92. The three pair of sieves are operated using the swinging system-consisting of eight valves designated as A through H inclusive. Where the hydrocarbon feed stream is being fed through beds 36 and 52 to adsorb the impurities therein on the molecular sieve within the bed while desorbing the spent molecular sieve in beds 36′ and 52′ while hydrogen is admitted through bed 40 while spent catalyst in bed 40′ is being regenerated by desorption, the swing system is arranged such that the valves A, D, E and H are open. When the molecular sieve is sated then the appropriate valves are turned so that the molecular sieve in the other bed which has been regenerated by desorption will adsorb the feed while the spent, molecular bed will undergo regeneration by desorption. This is done by opening valves B, C, F and G. All other valves in both instances are closed. Thus, the process can be run on a continuous basis advantageously using the gaseous effluent from the isomerization vessel to desorb spent molecular sieves used to purify the feed stream.

It can be seen therefore, the process is capable of commercial operation without employing additional equipment specifically for the use of regeneration of the molecular sieves. Our process is conveniently performed using the three pair of molecular sieves shown above, two of which are used to separate impurities from the hydrocarbon charge to the isomerization vessel and a third being used to separate any impurities from hydrogen charge to the isomerization vessel. In all cases these molecular sieves are regenerated using the gaseous effluent from the isomerization vessel.

In order to more particularly point out our invention, and illustrate the manner of practicing the same, the following example is presented. In this example all weights are in pounds, temperature in °F., pressure in p.s.i.g. units.

Example

Using a flow scheme as shown in FIGURES 1 and 2, a hydrocarbon fraction boiling in the range of about 95° to about 355° containing naphtha is fed into a dehexanizer 2 via line 4 and bottoms boiling in the range of about 110–355° F. are taken off via line 8. The overhead constituents are withdrawn in line 6 from dehexanizer 2 and are fed into heater 12 via line 10. The stream is heated to a temperature in the range of about 550 to about 750 and enters hydrotreating unit 16 via line 14. In hydrotreating unit 16 the feedstream is hydrotreated to hydrogenate sulfur, nitrogen, and oxygen compounds. The hydrogen to hydrocarbon mol ratio in hydrotreating unit 16 is between about 0.5 and 1.5 and the liquid hourly space velocity of the feed stream through the hydrotreating unit 16 is about 4.0. The temperature is between about 550 and 750 and the pressure in the hydrotreating unit 16 is about 500. The effluent from hydrotreating unit 16 is discharged in line 18 and enters separator 20 from which the gaseous components are withdrawn in line 22. These gaseous components contain a large percentage of ammonia and $H_2S$. The liquid constituents are withdrawn from separator 20 in line 24 and enters a stripper 26 which further serves to separate some of these aforesaid impurities i.e. $H_2S$, ammonia and some water from the hydrocarbon stream. The impurities pass out line 28 as a gas phase and the liquid hydrocarbon is withdrawn from stripper 26 in line 29. It enters deisopentanizer 30 from which is withdrawn an isopentane overhead in line 32. Normal pentane together with hexanes leaves deisopentanizer 30 in line 34 as bottom and enters molecular sieve bed 36 wherein impurities in the feed stream are selectively separated using a 4 A. molecular sieve. The liquid hourly space velocity of the feed stream through molecular sieve bed 36 is 4.5, the pressure is 500 and the temperature is 120. At the same time, molecular sieve bed 36 is being charged, molecular sieved bed 36' containing spent molecular sieve is being desorbed. This is done using a swing system shown in FIGURE 2. In this case, valves A, D, E and H are open and valves B, C, F and G are closed. Makeup hydrogen is introduced into the process lines via compressor 37, and line 38. It passes through molecular sieve bed 40 containing a 13× molecular sieve at a weight hourly space velocity of about 6.0 pounds of gas per hour per pound of sieve. Temperature of the hydrogen passing through the molecular sieve bed 40 is about 100 and it is under pressure of about 500. While molecular sieve bed 40 is selectively separating impurities from the makeup hydrogen stream spent molecular sieve in molecular sieve bed 40' is being desorbed. Molecular sieve bed 36' containing spent molecular sieve is also desorbed using the gaseous effluent from the isomerization vessel downstream of the molecular sieve beds 36 and 40 as more fully discussed below. In this case, valves A, D, E, and H are open, valves B, C, F and G being closed. The hydrocarbon stream from line 44 meets the hydrogen in line 42 and continues into line 46 and passes thence into a hydrogenation reactor 48 containing a nickel on alumina catalyst sold by Harshaw Chemical Company under the designation Ni–1404–T. The temperature in the hydrogenation reactor is 300 and the pressure is about 500. The liquid hourly space velocity through the hydrogenation reactor 48 is about 17. The effluent from hydrogenation reactor 48 is discharged in line 50 and is fed into the molecular sieve bed 52 which selectively separates impurities from the mixed hydrogen-hydrocarbon stream while its cooperating molecular sieve bed 52' containing spent molecular sieve is being desorbed using the swing system shown in FIGURE 2. In this case also bed 52' is being desorbed using the gaseous effluent from the isomerization reactor. Here too, the valves A, D, E and H are open, valves B, C, F and G being closed. The effluent from molecular sieve bed 52 is discharged in line 54 and passes into an isomerization reactor 56 maintained at a temperature within the range of about 280–330° F. and under pressure of between 300–750 p.s.i.g. The liquid hourly space velocity of the hydrocarbon stream consisting chiefly of n-pentane plus n-hexane is between about 0.75 and 4.0. The catalyst in the isomerization reactor is a platinum alumina composite activated with a halogenated hydrocarbon and stabilized in accordance with the process of U.S.P. 3,242,228. It is preferably activated using carbon tetrachloride in accordance with the procedure of copending application of Ser. No. 419,755, assigned to the assignee hereof. The isomerization vessel effluent is discharged in line 58. About 90% of normal hexane is converted to iso-hexane form, about 10% by weight about 2,2 dimethyl butane. This high percentage of 2,2 dimethyl butane which is approximately thermodynamic equilibrium is an indication of the activity of the isomerization catalyst and the overall efficiency of the isomerization process and the parameters used therefor. The effluent is discharged into separator 60. The liquid component is withdrawn from separator 60 in line 64 and enters a deethanizer 66 which separates an ethane component overhead in line 68. The liquid from the deethanizer is discharged into line 70 to de-butanizer 72 from which a propane/butane overhead is taken in line 74. The remaining components consisting largely of isohexanes and isopentanes are introduced via line 76 to depentanizer 78 from which is withdrawn overhead the pentanes in line 80 which is thence reintroduced into deisopentanizer 30. Isohexanes are withdrawn from depentanizer 78 as a bottoms in line 82.

The gaseous component of the isomerization effluent is then utilized to desorb spent molecular sieves in accordance with the invention. The gaseous component is withdrawn from separator 60 in line 62 and passes into sieve heater 84 which heats the gaseous component to a temperature of about 600° F. The effluent from the sieve heater 84 passes in line 86 and is split into lines 88, 90 and 92. These gases pass there through the open valve of the three pair of molecular sieves to desorb spent molecular sieve in beds 36', 40' and 52'. They leave the molecular sieve system in lines 94, 96 and 100 and are joined together in line 102 and thence re-enter the product line in line 10 and proceed as above.

From the above it is seen that we have provided a significantly useful contribution in hydrocarbon conversion advantageously using the gaseous component of a hydrocarbon conversion process, e.g. an isomerization process, to desorb spent molecular sieves in a manner which does not necessitate use of a separate system for desorption of the molecular sieves. Our process minimizes capital outlay and provides efficient conversion of hydrocarbons under the aforesaid conditions. It will be noted that these conditions are not unduly severe and can be provided with commercially available equipment.

The terms and expressions which have been employed herein are used as terms of description and not of limitation, as there is no intention, in the use of such terms and expressions, of excluding any equivalents of the features shown and described or portions thereof, but it is recognized that various modifications are possible within the scope of the invention claimed. For instance, a $C_7$ hydrocarbon can be isomerized using the process design of this invention. Generally, however, the conversion of n-heptanes to isoheptanes is lower than the conversion of n-hexane to isohexanes. Other hydrocarbons can be isomerized in which case the process parameters will vary.

It is also recognized that other sources of gas may be derived from the conversion vessel effluent and used to regenerate the molecular sieves. For example, the overhead vapor from the deethanizer may be used in lieu of product separator gas as the molecular sieve regeneration media.

What is claimed is:

1. A process for isomerizing a $C_4$ to $C_7$ isomerizable hydrocarbon containing an impurity of the group oxygen compounds, sulfur compounds, nitrogen compounds and unsaturated hydrocarbons which comprises:
   (a) passing the said isomerizable hydrocarbon through one molecular sieve bed from a plurality of sieve beds to selectively adsorb said impurity and transferring to another of said beds when said sieve bed becomes spent with usage, said sieve being of sufficient size to absorb said impurity but not of sufficient size to absorb said isomerizable hydrocarbon;
   (b) passing said isomerizable hydrocarbon from said molecular sieve bed into an isomerization vessel containing an isomerization catalyst and maintained under conditions of temperature and pressure suitable for isomerization;
   (c) withdrawing a liquid effluent from said vessel together with a gaseous effluent;
   (d) separating said gaseous effluent from said liquid effluent;
   (e) passing said gaseous effluent through said spent molecular sieve bed under conditions of temperature and pressure suitable for desorbing said impurity on said sieve; and,
   (f) recovering said isomerized hydrocarbon from said liquid effluent.

2. A process according to claim 1 wherein said bed comprises a 4 A. molecular sieve.

3. A process according to claim 1 wherein said bed comprises a 13× molecular sieve.

4. A process according to claim 1 wherein said gaseous effluent passes through said bed at a temperature from 400 to 700° F., and at a pressure of from about 5 to 400 p.s.i.g.

5. A process according to claim 1 wherein an isomerizable hydrocarbon is continuously passed through a molecular sieve bed to selectively separate the impurities therein; an effluent is continuously withdrawn from said molecular sieve bed and introduced into an isomerization vessel containing an isomerization catalyst and maintained under conditions of temperature and pressure suitable for isomerization; so-converted hydrocarbon is continuously withdrawn from said vessel together with a gaseous effluent; the gaseous effluent from said isomerization vessel is continuously separated from said liquid effluent; the gaseous effluent is continuously passed through a spent molecular sieve bed under conditions of temperature and pressure suitable for desorbing the impurities on the molecular sieve and isomerized hydrocarbon is continuously recovered from the liquid effluent from the isomerization vessel.

6. A process according to claim 5 wherein the conditions of isomerization include a temperature within the range of 200–350° F., a pressure within the range of 300–500 p.s.i.g., a liquid hourly space velocity of isomerizable hydrocarbon through the vessel of between about 0.5 and 10.0 and a mol ratio of hydrogen to hydrocarbon between about 0.05:1 and 5:1.

7. A process according to claim 6 wherein the isomerizable hydrocarbon is in the $C_4$–$C_6$ range.

8. A process according to claim 7 wherein the isomerizable hydrocarbon is hexane, the mol ratio of hydrogen to hexane is within the range of about 0.5:1 to 2:1, the temperature is within the range of between 280 and 330° F., and the liquid hourly space velocity is within the range of about 0.75 and 4.0.

9. A process according to claim 7 wherein the isomerizable hydrocarbon is hydrogenated under hydrogenation conditions prior to introduction into the isomerization vessel.

10. A process according to claim 9 wherein the hydrogen is passed through a molecular sieve to selectively separate impurities therein prior to introduction into the isomerization vessel.

11. A process according to claim 10 wherein the isomerizable hydrocarbon is a mixture of pentanes and hexanes.

12. A process according to claim 11 wherein the volumetric hourly space velocity of the gaseous effluent through the spent molecular sieve bed is between 45 and 250.

References Cited

UNITED STATES PATENTS

| | | | |
|---|---|---|---|
| 2,918,511 | 12/1959 | Carter et al. | 260—683.65 |
| 2,946,736 | 7/1960 | Muffat et al. | 208—57 |
| 3,020,322 | 2/1962 | Allen | 260—683.65 |
| 3,121,754 | 2/1964 | Mattox et al. | 260—683.65 |
| 3,201,344 | 8/1965 | Broughton | 208—144 |
| 3,260,762 | 7/1966 | Cabbage | 208—57 |

DELBERT E. GANTZ, *Primary Examiner.*

G. J. CRASANAKIS, *Assistant Examiner.*

U.S. Cl. X.R.

208—57, 144; 252—411